Nov. 17, 1964     G. H. ARTHUR     3,157,236
SPROCKET GEAR REDUCTION DRIVE FOR POWER SWIVEL ASSEMBLY
Filed Aug. 2, 1962     3 Sheets-Sheet 1

Glen H. Arthur
INVENTOR.

BY *Clarence A. O'Brien*
*and Harvey B. Jacobson*
Attorneys

Nov. 17, 1964 G. H. ARTHUR 3,157,236
SPROCKET GEAR REDUCTION DRIVE FOR POWER SWIVEL ASSEMBLY
Filed Aug. 2, 1962 3 Sheets-Sheet 2
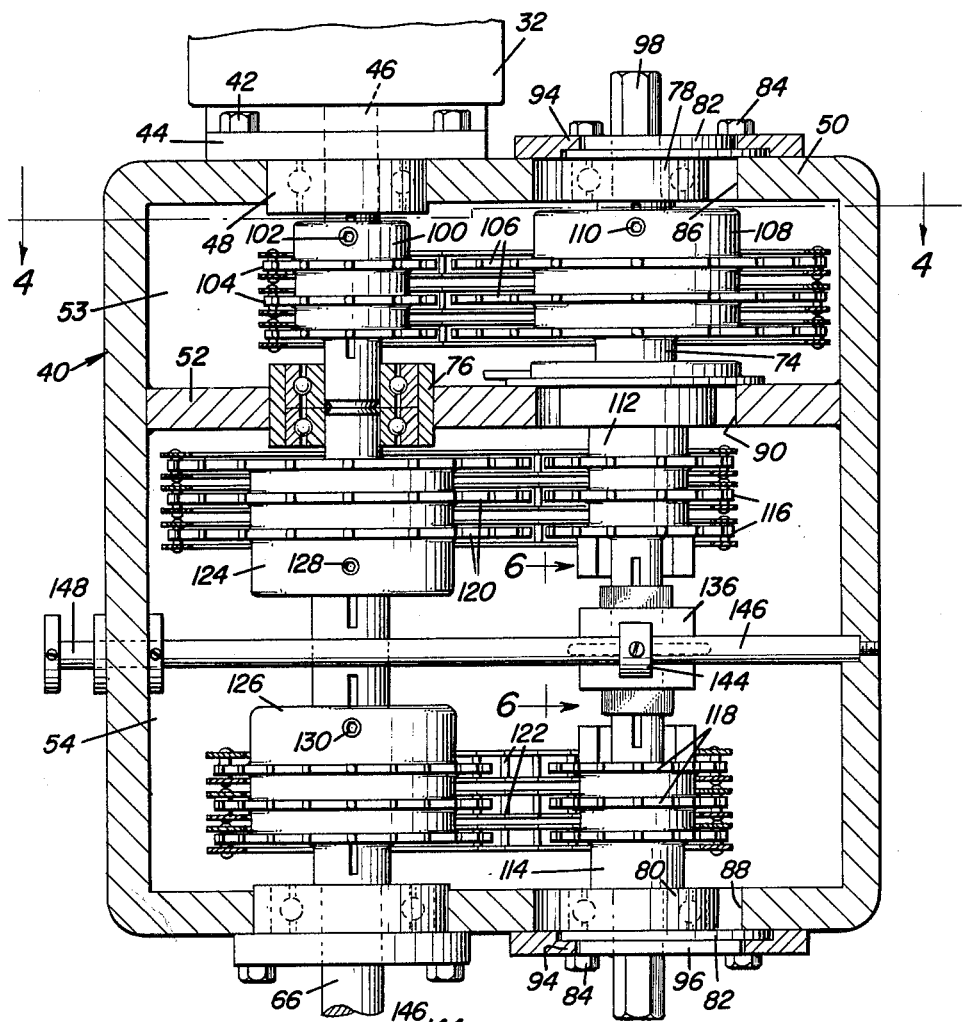
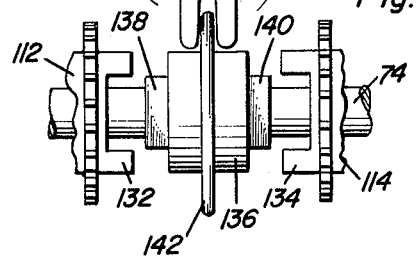
Glen H. Arthur
INVENTOR.

Nov. 17, 1964  G. H. ARTHUR  3,157,236
SPROCKET GEAR REDUCTION DRIVE FOR POWER SWIVEL ASSEMBLY
Filed Aug. 2, 1962  3 Sheets-Sheet 3

Glen H. Arthur
INVENTOR.

BY *Clarence A. O'Brien*
*and Harvey B. Jacobson*
Attorneys

United States Patent Office 3,157,236
Patented Nov. 17, 1964

3,157,236
SPROCKET GEAR REDUCTION DRIVE FOR
POWER SWIVEL ASSEMBLY
Glen H. Arthur, % Mohawk Oil Well Service,
P.O. Box 1454, Alice, Tex.
Filed Aug. 2, 1962, Ser. No. 214,219
14 Claims. (Cl. 173—57)

This invention comprises a novel and useful sprocket gear reduction drive for power swivel assembly and more particularly pertains to a continuation-in-part of my prior co-pending application Serial No. 83,474, filed January 18, 1961, for Hydraulically Operated Power Swivel, now Patent No. 3,053,330, issued on September 11, 1962.

In my prior patent there is disclosed a power operated swivel assembly adapted to be mounted upon and thus constituting a part of a conventional swivel of a rotary drilling apparatus or of a sub assembly connected to and driven by a conventional swivel and which thus provides an independent source of power for effecting controlled rotation for various purposes of a drilling string or other string of pipes or rods connected to and rotatably supported by the conventional swivel. Inasmuch as the utility of such a device has been set forth in my prior patent and is well understood by those skilled in the well drilling art, a further description of the functions and advantages of such an apparatus need not here be elaborated upon. It has been found, however, that in such power swivel assemblies an adjustable variation in the rate of rotation imparted to the driven string by the assembly is highly desirable and contributes greatly towards a more effective use of a power swivel assembly. Further, it is highly important to secure in such a device the benefits of a sprocket chain drive as set forth and claimed in my above identified prior patent.

It is therefore the primary purpose of this invention to provide a change speed transmission which is particularly adapted for use with a power swivel assembly and which will enable the power source of the swivel assembly to be connected at different speed ratios to the power output shaft and thus to the drill string or other string of rods to be rotated by the power swivel assembly.

A still further object of the invention is to provide a change speed transmission assembly which shall incorporate therein the advantages of a sprocket chain drive.

A further object of the invention is to provide a speed change transmission which shall be capable of being compactly incorporated into a power swivel assembly either in the swivel itself or in a swivel sub assembly and which shall further include the very important advantages of a sprocket chain drive therein.

Yet another object of the invention is to provide a device in accordance with the preceding objects in which the change in speed ratio may be readily effected from the exterior of the device with a minimum of effort thereby enabling the power output shaft of the assembly to be driven at different speeds as desired from a substantially constant speed input member of the assembly.

A further very important object of the invention is to provide a device in accordance with the preceding object which shall include therein provision for effectively and easily adjusting and compensating for the effect of wear in the speed changing and power transmitting mechanism thereof.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is a view in vertical section taken upon a greatly enlarged scale of the sprocket gear reduction drive transmission unit forming the subject matter of the invention claimed hereinafter, being taken substantially upon the plane indicated by section line 3—3 of FIGURE 2;

Figure 5:
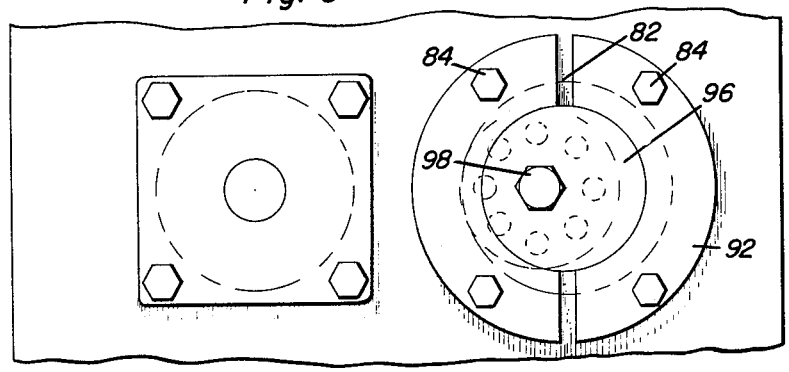

FIGURE 5 is a fragmentary detail view in bottom plan of FIGURE 3 and showing the adjustable eccentric mounting of the lay shaft forming a part of the variable speed reduction drive unit of the invention; and FIGURE 6 is a detail view in vertical transverse section taken substantially upon the plane indicated by section line 6—6 of FIGURE 3 and showing certain details of the speed changing mechanism of the invention.

Figure 1:
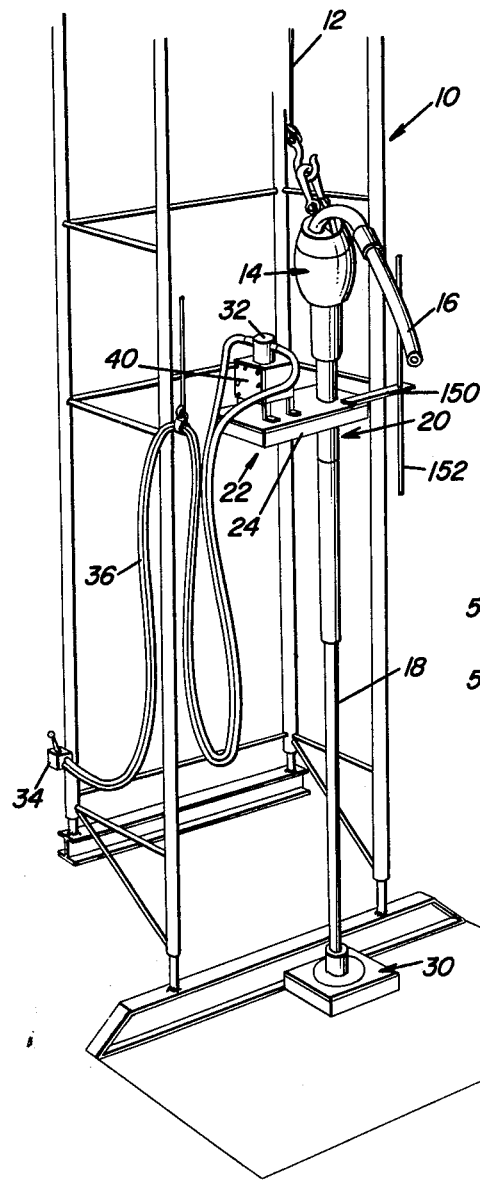
FIGURE 1 is a fragmentary perspective view of a portion of a rotary drilling rig showing the manner in which the power swivel assembly of this invention is connected to the upper end of a drilling string and is mounted upon a sub assembly carried by and secured to a conventional drilling rig swivel.

Reference is made first to FIGURE 1 wherein a portion of a conventional drilling rig derrick assembly is indicated generally by the numeral 10 and which includes the usual power operated cable assembly 12 by means of which a conventional swivel 14 is raised or lowered. This swivel has the usual connection as by means of a flexible hose or conduit 16 to a source of fluid under pressure by which the drilling fluid is supplied to the swivel and from thence to the drilling string 18. Indicated generally by the numeral 20 is a sub assembly by which the swivel is connected to the drilling string, and upon this sub assembly is shown mounted the power swivel assembly indicated generally by the numeral 22 of this invention. This assembly includes a housing or casing 24 in which is disposed the connecting means through which power from an independent source is transmitted to the sub 20 and from the latter to the drilling string 18 to rotate the latter independently of and as a substitute for the normal rotation as provided by the rotary table mechanism indicated generally by the numeral 30.

In accordance with this invention a source of power such as a conventional hydraulic motor 32 of a readily reversible type under the control of a reversing valve 34 is supplied with fluid from any suitable source, not shown, as for example the mud circulating pump of the drilling rig, by means of flexible conduits 36. The power output shaft of the motor 32 is directly connected to or may constitute the power input shaft of the variable speed transmission of the present invention and which transmission unit is indicated generally by the numeral 40. The power output shaft of the transmission is in turn connected to the drill string 18 through the medium of a connecting means housed within the container or housing 24 as set forth hereinafter and as disclosed and claimed in my prior patent.

Although for convenience of illustration the hydraulic motor 32 or other source of power of the power swivel assembly 22 is illustrated as being directly carried by the variable speed transmission assembly 40, and the latter in turn is directly mounted upon the housing 24 of the connecting means by which power is transferred to the drilling string, it will be appreciated that numerous other relative arrangements are possible. For example, the transmission assembly 40 could be directly mounted upon the swivel housing and supported solely thereby in the manner set forth in by prior patent. Moreover, the transmission assembly 40 as well as the connecting means within the housing 24 can be either or both readily built into the casing of the swivel 14 or a casing on the swivel sub 20 if desired.

Figure 2:
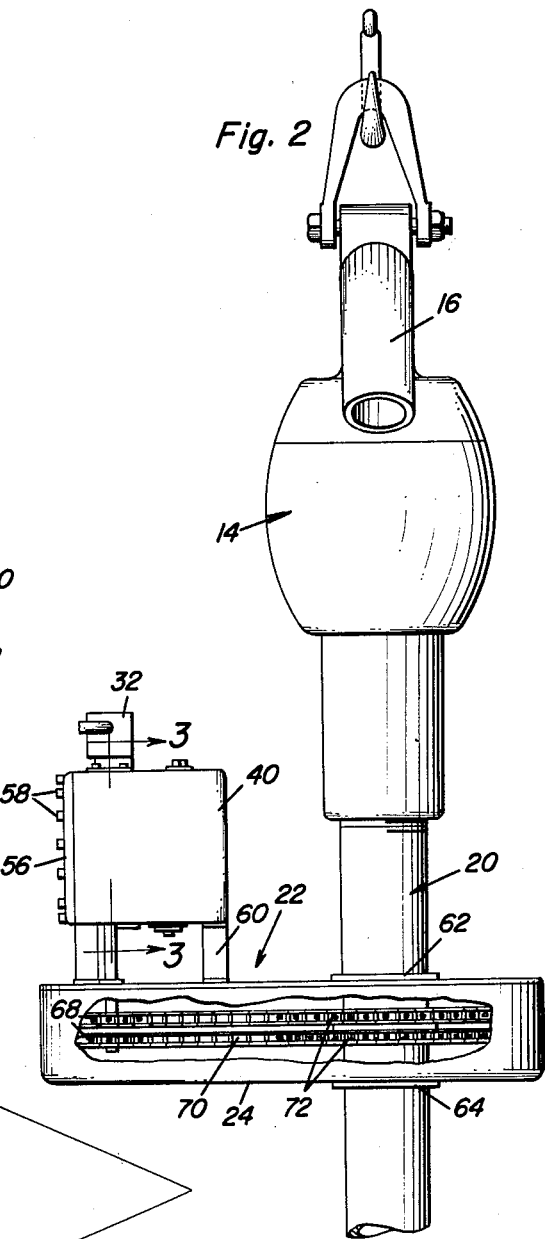
FIGURE 2 is an enlarged detail view in elevation of the power swivel assembly of FIGURE 1, parts being broken away.

Reference is now made particularly to FIGURES 2 and 3 for a better understanding of the power swivel assembly forming the subject matter of this invention. The transmission and reduction gear assembly casing 40 is of any desired size and shape and as shown best in FIGURE 3 has the hydraulic motor 32 directly and detachably secured to the top wall of the casing as by means of fastening bolts 42 extending through the mounting flange 44 of the hydraulic motor. The hydraulic motor has its power output shaft indicated in dotted lines at 46 in FIGURE 3 as extending through a bearing assembly 48 in the top wall 50 of the transmission 40. A partition 52 extends horizontally across the interior of the vertically elongated casing 40 and serves to divide the interior of the latter into an upper chamber or compartment 53 which houses the means connecting the power output shaft of the hydraulic motor to the change speed gearing assembly of the unit, has a lower compartment 54 which serves to house the change speed mechanism and the power output shaft therefrom.

Figure 4:
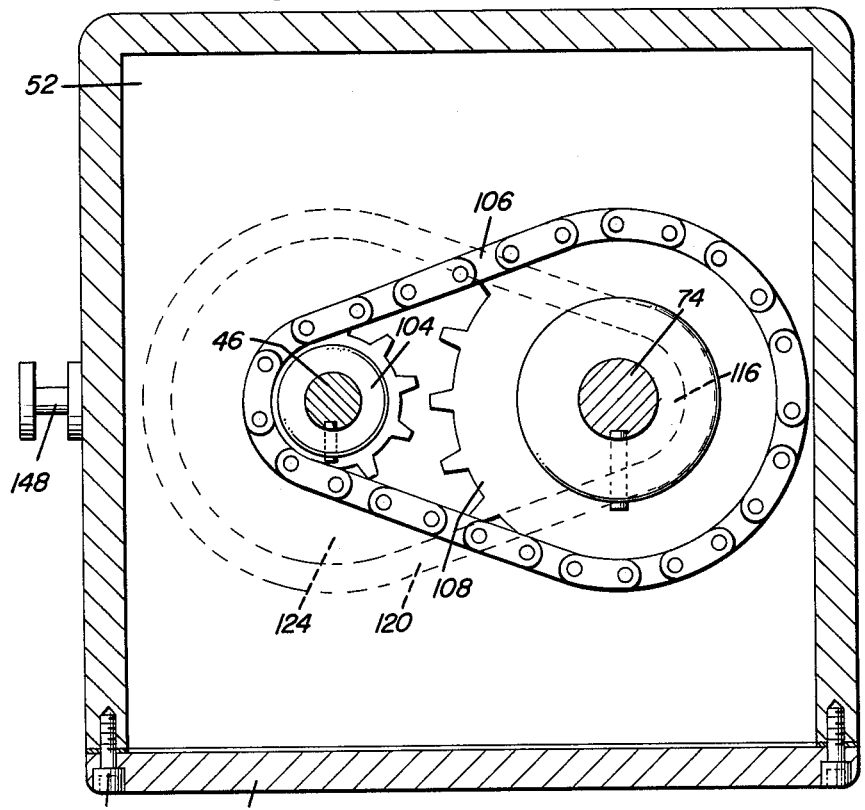
FIGURE 4 is a horizontal sectional view taken substantially upon the plane indicated by the section line 4—4 of FIGURE 3.

As shown in FIGURE 4, the casing may be provided with a closure wall 56 at one side thereof which is detachably secured as by fastening bolts 58 to obtain ready access to the interior of the two compartments.

As shown in FIGURE 2, the change speed transmission assembly 40 is itself detachably mounted upon the top wall of the connecting means housing 24 as by means of suitable brackets 60. The housing 24 is itself supported upon and surrounds the rotating sub 20, being retained thereon as by the upper and lower collars or flanges shown at 62 and 64. Insofar as the present invention is concerned, the structural details by which the change speed gearing assembly 40 is mounted upon the housing 24, by which the latter is mounted on the sub 20, and by which the power output shaft of the transmission unit is operatively connected to the sub shaft may be of any conventional design, and the structure set forth in my above identified patent is particularly suitable for this purpose. By way of illustration only, the power output shaft 66 of the transmission unit is provided within the housing 24 with one or more sprocket wheels as at 68 which through the sprocket chain 70 are in turn connected to the sprocket 72 fixedly secured to the sub shaft 20 in any suitable manner. Thus, there is established a sprocket chain drive between the power unit of the assembly and the driven shaft of the drill string which may be either the swivel shaft itself or the sub connected to the swivel shaft and to the drilling string. Inasmuch as the details of this structure form no part of the invention claimed herein but are set forth and claimed in my prior patent, a further description is deemed to be unnecessary for the purposes of setting forth the invention claimed hereinafter.

It is the construction, arrangement and operation of the adjustable speed sprocket chain reduction drive assembly or the unit 40 which forms the essence of the invention disclosed and claimed hereinafter. Again referring to FIGURE 3 it will be observed that the unit 40 includes therein three power shafts as follows: First, there is the power input shaft 46 which may comprise either the power output shaft of the hydraulic motor 32 or a sub shaft connected thereto, and which extends through the bearing 48 in the top wall 50 of the transmission casing into the compartment 53. There, the shaft 46 is connected by a driving means to be subsequently set forth to a counter or lay shaft 74. The latter in turn is connected through a chain speed reduction gearing to the power output shaft 66 which in turn extends to or has an extension extending into the housing 24 of the connecting means.

It will be noted that the power input shaft 46 is disposed in axial alignment with the power output shaft 66, the adjacent ends of these two shafts being journaled in a bearing assembly 76 extending through and carried by the partition 52 and providing a separate antifriction means for the adjacent ends of the two shafts.

The lay shaft or counter shaft 74 has its opposite extremities journaled in upper and lower bearing assemblies 78 and 80 respectively which are each secured to and rigidly mounted upon a pair of adjusting disks 82 in an eccentric manner. The disks 82 are journaled in retaining bearing members secured removably as by fastening bolts 84 to the exterior of the top and bottom walls of the transmission unit 40. These top and bottom walls together with the partition 52 have enlarged apertures 86, 88 and 90 therethrough in which are loosely and adjustably received the bearing assemblies 78 and 80 and a mid portion of the counter shaft in the partition 52. Referring now to FIGURE 5 it will be noted that the fasteners 84 releasably secure a pair of complementary sectional bearing retainers each indicated by the numeral 92. The bearing retainers include overlying flanges 94 which overlie and thus retain the plates 82 to which the bearings 78 and 80 are fixed, and also serve to surround and journal the cylindrical but eccentric projecting portions 96 of the plates 82. It will thus be apparent that by means of the retainers 94, the bearing assemblies are securely retained in the top and bottom walls of the unit 40. However, by means of projecting eccentrically disposed handles 98, after the fasteners 84 have been sufficiently loosened, the bearing assembly mounting plates 82 may be eccentrically adjusted to thereby move the bearings and the counter shaft 74 journaled therebetween towards or from the driving and driven shafts 46 and 66. This adjustment can be readily effected from the exterior of the case.

Referring again specifically to FIGURE 3 it will be seen that a hub or sleeve 100 is secured as by a setscrew or the like 102 to the power input shaft 46 and has one or more sprocket wheels 104 fixedly secured thereto. Each of these sprocket wheels is connected as by sprocket chain 106 to a corresponding sleeve or hub 108 secured to the upper end of the counter shaft 74 as by a setscrew 110 within the compartment 53. Thus, a continuous sprocket chain drive is established between the input shaft 46 and the counter shaft 74.

Referring now to the two speed reduction gear transmission provided in the compartment 54, it will be noted that there is rotatably secured to the lower portion of the counter shaft 74 a pair of sleeves or hubs comprising a low speed driving hub 112 and high speed driving hub or sleeve 114 which are suitably fixedly secured to the counter shaft in spaced relation to each other. Each of these hubs has a plurality of driving sprockets 116, 118 provided thereon which are connected as by sprocket chains 120, 122 to corresponding driven sleeves or hubs 124, 126 which are secured to the output shaft 66 as by setscrews 128, 130. It should be noted that while the two output hubs 124 and 126 are fixedly secured to the output shaft as by splines and the previously mentioned setscrews, the driving hubs 112 and 114 are loosely and rotatably received upon the counter shaft. Referring now to FIGURE 6 in conjunction with FIGURE 3 it will be noted that the adjacent ends of the counter shaft driving sprocket hubs 112 and 114 are provided with projections or teeth 132, 134 projecting towards each other and which thus define clutches of the jaw type. A clutch member 136 in the form of a sleeve is splined upon the counter shaft 74 for axial movement thereon but is restrained by the key or spline against relative rotation. The opposite ends of the clutch sleeve 136 are provided with clutch jaws as at 138 and 140 which respectively cooperate with the clutch members 132 and 134 of the hubs or sleeves 112 and 114. An adjusting rib 142 is disposed medially and circumferentially of the clutch sleeve 136 and is engageable by an adjusting or shifter fork 144 fixedly mounted upon a shaft 146. The shaft 146 is secured in the unit 40 and extends transversely between opposite walls thereof and extending to the exterior of the casing is provided with an operating portion 148. The arrangement is such that by rocking the shaft as indicated by the arrows S and F in FIGURE 6, the clutch member may be moved from a neutral position indicated N where the clutch jaws are out of engagement with either of the driving hubs 112 and 114 to a position where it will selectively engage one or the other of these hubs and thus establish a driving engagement with the corresponding driven hub 124, 126 on the power output shaft 66.

Obviously, the two speed ratios of the sprockets upon the hubs 112, 124 and 114, 126 will be so selected that the connecting sprocket chains 120 and 122 will impart rotation at different selected speeds to the power output shaft 66.

An important feature of this arrangement is that instant change of the speed ratios between the power input shaft and the power output shaft is available by merely manually manipulating the externally projecting extremity 148 of the control shaft 146.

A basic and important feature of this transmission unit is that use is made of a sprocket chain drive rather than a gear drive between the power input shaft, the counter shaft and the power output shaft of the unit. For the reasons set forth in my above identified patent, it has been found that a sprocket chain drive will perform satisfactorily under conditions where a gear drive will inevitably fail. However, since it is necessary that the power input and power output shafts be disposed for rotation about vertical axes, and the connecting sprocket chains must be disposed horizontally, a problem would arise from the unavoidable wear in the sprocket chain drive which might cause the chains to jump from their sprockets. This difficulty is effectively overcome by the provision of the eccentric bearings of the counter shaft which enables ready and precise adjustment to be made in the spacing of the counter shaft and the driving and driven shafts so as to simultaneously tension and take up any slack developing in the sprocket chains 106, 120 and 122.

It will be noted that with this arrangement the counter shaft is disposed more closely adjacent to the sub 20 than are the power input and output shafts. This arrangement is beneficial since it permits the greatest latitude in the selection of the sizes of the driving and driven sprockets 68 and 72 of the connecting means in the housing 22. Consequently, the entire power swivel assembly is rendered as compact as possible, a very important desideratum in rotary drilling operations in which the available space for lateral movement of the assembly is frequently very limited.

Referring again to FIGURE 1 it will be noted that the numeral 150 indicates a torque arm which is suitably secured to the power swivel assembly 22 as for example to the housing 24. This torque arm provides a means which will prevent rotation of the assembly about the vertical axis of the drill string when power is applied by the hydraulic motor 32 to the device. Any suitable means may be provided to cooperate with the torque arm to prevent such undesired reverse rotation of the unit, as for example a guy wire or cable 152 or the like. It will be understood that the torque arm may be secured to any component of the power swivel assembly.

As a result of this apparatus, it will be evident that rotation can be imparted in either direction at either of two selected speeds of rotation to the drill string 18. Thus, relatively slow rotation may be imparted thereto to effect various working operations in connection with the drilling or servicing of a well, while a relatively high speed of rotation may be imparted as for example when it is desired to rotate the sub 20 in order to unscrew joints, connect up joints and the like in a drilling string.

The foregoing is considered as illustrative only of the principles of the invention. Further, since numerous modifications and changes will readily occur to those skilled in the art, it is not desired to limited the invention to the exact construction and operation shown and described, and accordingly all suitable modifications and equivalents may be resorted to, falling within the scope of the invention as claimed.

I claim:

1. A power swivel assembly for the rotary drilling of deep wells comprising a tubular shaft adapted to be drivingly engaged with and support a drill string or the like, a fluid motor, a two-speed sprocket chain transmission unit driven by said motor, means drivingly connecting said transmission unit to said tubular shaft, said transmission unit including a casing and vertically aligned power input and power output shafts each extending from the interior to the exterior of said casing, a vertical counter shaft journaled in said casing and parallel to said input and output shafts, a pair of sprocket chain drives of different speed ratios connecting said countershaft to said output shaft, means for selectively rendering one of said chain drives operative while the other chain drive is rendered inoperative, means in said casing drivingly connecting said input shaft to said counter shaft.

2. A power swivel assembly for the rotary drilling of deep wells comprising a swivel and a sub connected to and carried by said swivel for driving connection with and support of a drilling string, a power drive unit connected to and supported by said sub, said power drive unit including a fluid motor, a two-speed reduction drive transmission unit connected to and driven by said motor and means drivingly connecting said transmission unit to said sub, said transmission unit including a casing and vertically aligned power input and power output shafts each extending from the interior to the exterior of said casing, a vertical counter shaft journaled in said casing and parallel to said input and output shafts, a pair of sprocket chain drives of different speed ratios connecting said counter shaft to said output shaft, means for selectively rendering one of said chain drives operative while the other chain drive is rendered inoperative, means in said casing drivingly connecting said input shaft to said counter shaft.

3. A power swivel assembly for the rotary drilling of deep wells comprising a tubular shaft adapted to be drivingly engaged with and support a drill string or the like, a fluid motor, a two-speed sprocket chain transmission unit driven by said motor, means drivingly connecting said transmission unit to said tubular shaft, said transmission unit including a casing and vertically aligned power input and power output shafts each extending from the interior to the exterior of said casing, a vertical counter shaft journaled in said casing and parallel to said input and output shafts, a pair of sprocket chain drives of different speed ratios connecting said counter shaft to said output shaft, means for selectively rendering one of said chain drives operative while the other chain drive is rendered inoperative, means in said casing drivingly connecting said input shaft to said counter shaft, means operable from the exterior of said transmission unit for operating said selective means.

4. A power swivel assembly for the rotary drilling of deep wells comprising a swivel and a sub connected to and carried by said swivel for driving connection with and support of a drilling string, a power drive unit connected to and supported by said sub, said power drive unit including a fluid motor, a two-speed reduction drive transmission unit connected to and driven by said motor and means drivingly connecting said transmission unit to said sub, said transmission unit including a casing and vertically aligned power input and power output shafts each extending from the interior to the exterior of said casing, a vertical counter shaft journaled in said casing and parallel to said input and output shafts, a pair of sprocket chain drives of different speed ratios connecting said counter shaft to said output shaft, means for selectively rendering one of said chain drives operative while the other chain drive is rendered inoperative, means in said casing drivingly connecting said input shaft to said counter shaft, means operable from the exterior of said transmission unit for operating said selective means.

5. A power swivel assembly for the rotary drilling of deep wells comprising a tubular shaft adapted to be drivingly engaged with and support a drill string or the like, a fluid motor, a two-speed sprocket chain transmission unit driven by said motor, means drivingly connecting said transmission unit to said tubular shaft, said transmission unit including a casing and vertically aligned power input and power output shafts each extending from the interior to the exterior of said casing, a vertical counter shaft journaled in said casing and parallel to said input and output shafts, a pair of sprocket chain drives of different speed ratios connecting said countershaft to said output shaft, means for selectively rendering one of said chain drives operative while the other chain drive is rendered inoperative, means in said casing drivingly connecting said input shaft to said counter shaft, means for simultaneously adjusting for wear between said input and output shafts and said counter shaft.

6. A power swivel assembly for the rotary drilling of deep wells comprising a swivel and a sub connected to and carried by said swivel for driving connection with and support of a drilling string, a power drive unit connected to and supported by said sub, said power drive unit including a fluid motor, a two-speed reduction drive transmission unit connected to and driven by said motor and means drivingly connecting said transmission unit to said sub, said transmission unit including a casing and vertically aligned power input and power output shafts each extending from the interior to the exterior of said casing, a vertical counter shaft journaled in said casing and parallel to said input and output shafts, a pair of sprocket chain drives of different speed ratios connecting said counter shaft to said output shaft, means for selectively rendering one of said chain drives operative while the other chain drive is rendered inoperative, means in said casing drivingly connecting said input shaft to said counter shaft, means for simultaneously adjusting for wear between said input and output shafts and said counter shaft.

7. A power swivel assembly for the rotary drilling of deep wells comprising a tubular shaft adapted to be drivingly engaged with and support a drill string or the like, a fluid motor, a two-speed sprocket chain transmission unit driven by said motor, means drivingly connecting said transmission unit to said tubular shaft, said transmission unit including a casing and vertically aligned power input and power output shafts each extending from the interior to the exterior of said casing, a vertical counter shaft journaled in said casing and parallel to said input and output shafts, a pair of sprocket chain drives of different speed ratios connecting said counter shaft to said output shaft, means for selectively rendering one of said chain drives operative while the other chain drive is rendered inoperative, means in said casing drivingly connecting said input shaft to said counter shafts, means for simultaneously adjusting for wear between said input and output shafts and said counter shaft, said last named means including eccentric bearings for said counter shaft and adjusting means on said bearings operable from the exterior of said transmission unit.

8. A power swivel assembly for the rotary drilling of deep wells comprising a swivel and a sub connected to and carried by said swivel for driving connection with and support of a drilling string, a power drive unit connected to and supported by said sub, said power drive unit including a fluid motor, a two-speed reduction drive transmission unit connected to and driven by said motor and means drivingly connecting said transmission unit to said sub, said transmission unit including a casing and vertically aligned power input and power output shafts each extending from the interior to the exterior of said casing, a vertical counter shaft journaled in said casing and parallel to said input and output shafts, a pair of sprocket chain drives of different speed ratios connecting said counter shaft to said output shaft, means for selectively rendering one of said chain drives operative while the other chain drive is rendered inoperative, means in said casing drivingly connecting said input shaft to said counter shaft, means for simultaneously adjusting for wear between said input and output shafts and said counter shaft, said last named means including eccentric bearings for said counter shaft and adjusting means on said bearings operable from the exterior of said transmission unit.

9. The combination of claim 4 wherein said motor is mounted directly upon said transmission unit.

10. The combination of claim 5 wherein said motor is mounted directly upon said transmission unit and the latter is directly mounted upon said connecting means.

11. The combination of claim 4 including means for supplying drilling fluid under pressure to said swivel and from the latter to said sub and from thence to the attached drill string.

12. The combination of claim 5 including means for supplying drilling fluid under pressure to said tubular shaft and from the latter to the attached drill string.

13. The combination of claim 4 wherein all of the power transmitting elements between said motor and said sub comprise sprocket chain drives.

14. The combination of claim 5 wherein all of the power transmitting elements between said motor and said tubular shaft comprise sprocket chain drives.

References Cited in the file of this patent

UNITED STATES PATENTS

| | | |
|---|---|---|
| 1,617,129 | Liabo | Feb. 8, 1927 |
| 2,169,780 | Wilson | Aug. 15, 1939 |
| 2,783,654 | Carnell | Mar. 5, 1957 |
| 2,885,896 | Hungerford | May 12, 1959 |
| 3,012,620 | Gaines | Dec. 12, 1961 |
| 3,053,330 | Arthur | Sept. 11, 1962 |